(12) United States Patent
Qiao et al.

(10) Patent No.: US 9,965,188 B2
(45) Date of Patent: May 8, 2018

(54) MEMORY CLEANING METHOD AND APPARATUS, AND TERMINAL DEVICE

(71) Applicant: Huawei Device (Dongguan) Co., Ltd., Dongguan (CN)

(72) Inventors: Yonghong Qiao, Beijing (CN); Zhen Wu, Beijing (CN)

(73) Assignee: HUAWEI DEVICE (DONGGUAN) CO., LTD., Dongguan (CN)

(*) Notice: Subject to any disclaimer, the term of this patent is extended or adjusted under 35 U.S.C. 154(b) by 299 days.

(21) Appl. No.: 14/808,767

(22) Filed: Jul. 24, 2015

(65) Prior Publication Data

US 2015/0331612 A1 Nov. 19, 2015

Related U.S. Application Data

(63) Continuation of application No. PCT/CN2014/070792, filed on Jan. 17, 2014.

(30) Foreign Application Priority Data

Feb. 1, 2013 (CN) .......................... 2013 1 0041187

(51) Int. Cl.
*G06F 12/00* (2006.01)
*G06F 13/00* (2006.01)
(Continued)

(52) U.S. Cl.
CPC .......... *G06F 3/0608* (2013.01); *G06F 3/0652* (2013.01); *G06F 3/0653* (2013.01);
(Continued)

(58) Field of Classification Search
CPC ... G06F 12/0253; G06F 9/5022; G06F 12/023
See application file for complete search history.

(56) References Cited

U.S. PATENT DOCUMENTS

2001/0049764 A1* 12/2001 Lu ...................... G06F 12/0246
711/103
2005/0034129 A1 2/2005 Chew
(Continued)

FOREIGN PATENT DOCUMENTS

CN 101493821 A 7/2009
CN 101859261 A 10/2010
(Continued)

OTHER PUBLICATIONS

"Internet Shopping Latest Circumstances," Nikkei Personal Computing 10.22, http://pc.nikkeibp.co.jp/, Feature Story 1, Must-See Smartphone Application selected by Satoru Today, 2012, 7 pages.
(Continued)

*Primary Examiner* — Sean D Rossiter
(74) *Attorney, Agent, or Firm* — Slater Matsil, LLP

(57) ABSTRACT

A memory cleaning method and apparatus, and a terminal device are provided. The memory cleaning method includes: acquiring information about application processes that occupy memory of a terminal device; determining, according to behavior characteristic information of using an application by a user, that a first application process in the application processes is an application process for which cleaning is not performed; and performing memory cleaning processing on an application process, except the first application process, in the application processes, so that it may be implemented that memory cleaning is performed according to the behavior characteristic information of using an application by the user and operating performance of the terminal device is improved. Furthermore a response time required when the user starts the first application process again is reduced, and an experience effect of using the terminal device by the user is ensured.

16 Claims, 6 Drawing Sheets

(51) Int. Cl.
*G06F 3/06* (2006.01)
*G06F 12/02* (2006.01)
*G06F 9/50* (2006.01)

(52) U.S. Cl.
CPC .............. *G06F 3/0673* (2013.01); *G06F 9/50* (2013.01); *G06F 9/5022* (2013.01); *G06F 12/023* (2013.01)

(56) References Cited

U.S. PATENT DOCUMENTS

| | | | |
|---|---|---|---|
| 2009/0113444 A1* | 4/2009 | Hackborn | G06F 9/461 719/312 |
| 2010/0235835 A1 | 9/2010 | Nishiguchi et al. | |
| 2012/0246116 A1 | 9/2012 | Yang et al. | |
| 2012/0324481 A1 | 12/2012 | Xia et al. | |
| 2013/0074082 A1 | 3/2013 | Yu | |
| 2015/0331612 A1* | 11/2015 | Qiao | G06F 12/023 711/166 |

FOREIGN PATENT DOCUMENTS

| | | |
|---|---|---|
| CN | 102004743 A | 4/2011 |
| CN | 103092700 A | 5/2013 |
| JP | 2005202652 A | 7/2005 |
| JP | 2005275707 A | 10/2005 |
| JP | 2008097425 A | 4/2008 |
| JP | 2010211526 A | 9/2010 |
| JP | 2012248200 A | 12/2012 |
| KR | 20120139541 A | 12/2012 |

OTHER PUBLICATIONS

Nakazima, Y. et al., "Android SDK Game Programming with Open GL; Game Programming with Android SDK," First Edition, Pankaku Co., Ltd., Apr. 11, 2011, 2 pages.

* cited by examiner

MEMORY CLEANING METHOD AND APPARATUS, AND TERMINAL DEVICE

This application is a continuation of International Application No. PCT/CN2014/070792, filed on Jan. 17, 2014, which claims priority to Chinese Patent Application No. 201310041187.5, filed on Feb. 1, 2013, both of which are hereby incorporated by reference in their entireties.

TECHNICAL FIELD

Embodiments of the present invention relate to memory management technologies, and in particular, to a memory cleaning method and apparatus, and a terminal device.

BACKGROUND

With the popularity of smartphones, applications developed for smartphones are increasing. Users may download and install various applications in a mobile phone at their own discretion, and may simultaneously start multiple applications. More concurrently running processes indicate more occupied memory in the mobile phone, thereby causing a decrease in operating performance of the mobile phone. Therefore, memory cleaning needs to be performed on the mobile phone, so as to release a part of memory to improve operating performance of the mobile phone.

In the prior art, mainly, memory cleaning software is preset in a mobile phone, the memory cleaning software may monitor a status of memory in the mobile phone, and when available memory is less than a first preset value, performs cleaning on memory of the mobile phone, that is, performs sequencing according to lengths of times of running of application processes switched to running in a background; then, performs cleaning, according to a sequence starting from a process of which a time of running of the process switched to running in the background is the longest, on memory occupied by processes, until the available memory is greater than a second preset value, so as to achieve an objective of releasing a part of memory to improve operating performance of the mobile phone.

However, in the prior art, cleaning is performed, according to a length of a time of running of a process switched to running in a background, on memory occupied by an application; therefore, an application frequently used by a user may be cleaned from the memory, thereby causing a relatively long response time required when the user starts the application again.

SUMMARY

Embodiments of the present invention provide a memory cleaning method and apparatus, and a terminal device, which are used to determine, according to behavior characteristic information of using an application by a user, an first application process for which cleaning is not performed, and then perform memory cleaning processing on an application process except the first application process, thereby resolving a problem in the prior art and reducing a response time required when the user starts the first application process again.

According to a first aspect, an embodiment of the present invention provides a memory cleaning method, including:
acquiring information about application processes that occupy memory of a terminal device;
determining, according to behavior characteristic information of using an application by a user, that a first application process in the application processes is an application process for which cleaning is not performed; and
performing memory cleaning processing on an application process, except the first application process, in the application processes.

In a first possible implementation manner of the first aspect, before the determining, according to behavior characteristic information of using an application by a user, that a first application process in the application processes is an application process for which cleaning is not performed, the method further includes:
receiving a memory cleaning request input by the user; or
determining that available memory of the terminal device is less than a preset value of memory.

With reference to the first aspect or the first possible implementation manner of the first aspect, in a second possible implementation manner of the first aspect, before the acquiring information about application processes that occupy memory of a terminal device, the method further includes:
acquiring the behavior characteristic information of using an application by the user.

With reference to the second possible implementation manner of the first aspect, in a third possible implementation manner of the first aspect, the behavior characteristic information includes: a usage time record of an application process and at least one of: a quantity of cumulative times of using the application process, duration in which the application process is used each time, and cumulative duration in which the application process is used.

With reference to the third possible implementation manner of the first aspect, in a fourth possible implementation manner of the first aspect, before the acquiring the behavior characteristic information of using an application by the user, the method further includes:
receiving a timing expiration indication message that is that is sent by a timer when a timing period expires; and
the acquiring the behavior characteristic information of using an application by the user includes:
acquiring event record information of the application process from an activity manager service AMS, where the event record information includes an application process startup event and/or an application process suspension event;
updating, according to an event included in the event record information, the usage time record of the application process; and
acquiring, by means of counting according to the usage time record of the application process, at least one of: the quantity of cumulative times of using the application process, the duration in which the application process is used each time, and the cumulative duration in which the application process is used.

With reference to the fourth possible implementation manner of the first aspect, in a fifth possible implementation manner of the first aspect, if the event record information is the application process startup event, the acquiring, by means of counting according to the usage time record of the application process, at least one of: the quantity of cumulative times of using the application process, the duration in which the application process is used each time, and the cumulative duration in which the application process is used includes:
determining, according to the application process startup event, the quantity of cumulative times of using the application process;

if the event record information is the application process suspension event, the acquiring, by means of counting according to the usage time record of the application process, at least one of: the quantity of cumulative times of using the application process, the duration in which the application process is used each time, and the cumulative duration in which the application process is used includes:

determining, according to the usage time record, the application process suspension event, and an application process startup event corresponding to the application process suspension event, at least one of: the duration in which the application process is used each time and the cumulative duration in which the application process is used; or if the event record information is the application process startup event and the application process suspension event, the acquiring, by means of counting according to the usage time record of the application process, at least one of: the quantity of cumulative times of using the application process, the duration in which the application process is used each time, and the cumulative duration in which the application process is used includes:

determining, according to the application process startup event, the quantity of cumulative times of using the application process; and determining, according to the usage time record, the application process suspension event, and an application process startup event corresponding to the application process suspension event, at least one of: the duration in which the application process is used each time and the cumulative duration in which the application process is used.

With reference to the fifth possible implementation manner of the first aspect, in a sixth possible implementation manner of the first aspect, the method further includes:

determining an application process whose startup time or suspension time in a usage time record of an already suspended application process has a difference of greater than or equal to a first preset value with a cumulative timed time of the timer; and deleting behavior characteristic information corresponding to the startup time or the suspension time of the application process.

With reference to the third possible implementation manner of the first aspect, the fourth possible implementation manner of the first aspect, the fifth possible implementation manner of the first aspect, or the sixth possible implementation manner of the first aspect, in a seventh possible implementation manner of the first aspect, the determining, according to behavior characteristic information of using an application by a user, that a first application process in the application processes is an application process for which cleaning is not performed includes:

if it is determined, according to a usage time record of the first application process, that a difference between a last suspension time of the first application process and the cumulative timed time of the timer is less than or equal to a second preset value, determining that the first application process is the application process for which cleaning is not performed; or if it is determined, according to a usage time record of the first application process, that a difference between a last suspension time of the first application process and the cumulative timed time of the timer is greater than a second preset value and less than or equal to a third preset value, determining whether a quantity of cumulative times of using the first application process and/or cumulative duration in which the first application process is used exceed or exceeds a preset threshold; and if the quantity of cumulative times of using the first application process and/or cumulative duration in which the first application process is used exceed or exceeds the preset threshold, determining that the first application process is the application process for which cleaning is not performed.

With reference to the fourth possible implementation manner of the first aspect, the fifth possible implementation manner of the first aspect, the sixth possible implementation manner of the first aspect, or the seventh possible implementation manner of the first aspect, in an eighth possible implementation manner of the first aspect, the event record information acquired from the AMS further includes an application process association event; and the performing memory cleaning processing on an application process, except the first application process, in the application processes includes:

determining, according to the application process association event, whether an application process that has an association relationship with the first application process exists in application processes on which memory cleaning processing needs to be performed; and if the application process that has an association relationship with the first application process exists, performing memory cleaning processing on an application process, except the application process that has an association relationship with the first application process, in the application processes on which memory cleaning processing needs to be performed.

According to a second aspect, an embodiment of the present invention provides a memory cleaning apparatus, including:

a first acquiring module, configured to acquire information about application processes that occupy memory of a terminal device;

a first determining module, configured to determine, according to behavior characteristic information of using an application by a user, that a first application process in the application processes is an application process for which cleaning is not performed; and a processing module, configured to perform memory cleaning processing on an application process, except the first application process, in the application processes.

In a first possible implementation manner of the second aspect, the apparatus further includes:

a first receiving module, configured to: before the first determining module determines, according to the behavior characteristic information of using an application by the user, that the first application process in the application processes is the application process for which cleaning is not performed, receive a memory cleaning request input by the user; or a second determining module, configured to: before the first determining module determines, according to the behavior characteristic information of using an application by the user, that the first application process in the application processes is the application process for which cleaning is not performed, determine that available memory of the terminal device is less than a preset value of memory.

With reference to the second aspect or the first possible implementation manner of the second aspect, in a second possible implementation manner of the second aspect, the apparatus further includes:

a second acquiring module, configured to: before the first acquiring module acquires the information about the application processes that occupy the memory of the terminal device, acquire the behavior characteristic information of using an application by the user.

With reference to the second possible implementation manner of the second aspect, in a third possible implementation manner of the second aspect, the behavior characteristic information includes: a usage time record of an application process and at least one of: a quantity of cumulative times of using the application process, duration in which the application process is used each time, and cumulative duration in which the application process is used.

With reference to the third possible implementation manner of the second aspect, in a fourth possible implementation manner of the second aspect, the apparatus further includes:

a second receiving module, configured to: before the second acquiring module acquires the behavior characteristic information of using an application by the user, receive a timing expiration indication message that is sent by a timer when a timing period expires, where the second acquiring module includes:

an acquiring unit, configured to acquire event record information of the application process from an activity manager service AMS, where the event record information includes an application process startup event and/or an application process suspension event;

an updating unit, configured to update, according to an event included in the event record information, the usage time record of the application process; and a counting unit, configured to acquire, by means of counting according to the usage time record of the application process, at least one of: the quantity of cumulative times of using the application process, the duration in which the application process is used each time, and the cumulative duration in which the application process is used.

With reference to the fourth possible implementation manner of the second aspect, in a fifth possible implementation manner of the second aspect, the counting unit is specifically configured to:

if the event record information is the application process startup event, determine, according to the application process startup event, the quantity of cumulative times of using the application process;

if the event record information is the application process suspension event, determine, according to the usage time record, the application process suspension event, and an application process startup event corresponding to the application process suspension event, at least one of: the duration in which the application process is used each time and the cumulative duration in which the application process is used; or if the event record information is the application process startup event and the application process suspension event, determine, according to the application process startup event, the quantity of cumulative times of using the application process; and determine, according to the usage time record, the application process suspension event, and an application process startup event corresponding to the application process suspension event, at least one of: the duration in which the application process is used each time and the cumulative duration in which the application process is used.

With reference to the fifth possible implementation manner of the second aspect, in a sixth possible implementation manner of the second aspect, the second acquiring module further includes:

a determining unit, configured to determine an application process whose startup time or suspension time in a usage time record of an already suspended application process has a difference of greater than or equal to a first preset value with a cumulative timed time of the timer; and a deleting unit, configured to delete behavior characteristic information corresponding to the startup time or the suspension time of the application process.

With reference to the third possible implementation manner of the second aspect, the fourth possible implementation manner of the second aspect, the fifth possible implementation manner of the second aspect, the sixth possible implementation manner of the second aspect, in a seventh possible implementation manner of the second aspect, the first determining module is specifically configured to:

if it is determined, according to a usage time record of the first application process, that a difference between a last suspension time of the first application process and the cumulative timed time of the timer is less than or equal to a second preset value, determine that the first application process is the application process for which cleaning is not performed; or if it is determined, according to a usage time record of the first application process, that a difference between a last suspension time of the first application process and the cumulative timed time of the timer is greater than a second preset value and less than or equal to a third preset value, determine whether a quantity of cumulative times of using the first application process and/or cumulative duration in which the first application process is used exceed or exceeds a preset threshold; and if the quantity of cumulative times of using the first application process and/or cumulative duration in which the first application process is used exceed or exceeds the preset threshold, determine that the first application process is the application process for which cleaning is not performed.

With reference to the fourth possible implementation manner of the second aspect, the fifth possible implementation manner of the second aspect, the sixth possible implementation manner of the second aspect, or the seventh possible implementation manner of the second aspect, in an eighth possible implementation manner of the second aspect, the event record information acquired from the AMS further includes an application process association event; and the processing module is specifically configured to determine, according to the application process association event, whether an application process that has an association relationship with the first application process exists in application processes on which memory cleaning processing needs to be performed; and if the application process that has an association relationship with the first application process exists, perform memory cleaning processing on an application process, except the application process that has an association relationship with the first application process, in the application processes on which memory cleaning processing needs to be performed.

According to a third aspect, an embodiment of the present invention provides a terminal device, including the memory cleaning apparatus described in the foregoing.

In a first possible implementation manner of the third aspect, the terminal device further includes: a mobile phone or a tablet computer.

According to the memory cleaning method and apparatus, and the terminal device that are provided in the embodiments of the present invention, it may be determined, according to behavior characteristic information of using an application by a user, that a first application process is an application process for which cleaning is not performed; and memory cleaning processing is then performed on an application process, except the first application process, in application processes that occupy memory of the terminal device, so that it may be implemented that cleaning is performed on memory according to the behavior characteristic information of using an application by the user and operating performance of the terminal device is improved. Because memory cleaning is not performed on the first application process according to the behavior characteristic information of using an application by the user, a problem in the prior art is resolved, so that a response time required when the user starts the first application process again is reduced, and an experience effect of using the terminal device by the user is ensured.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
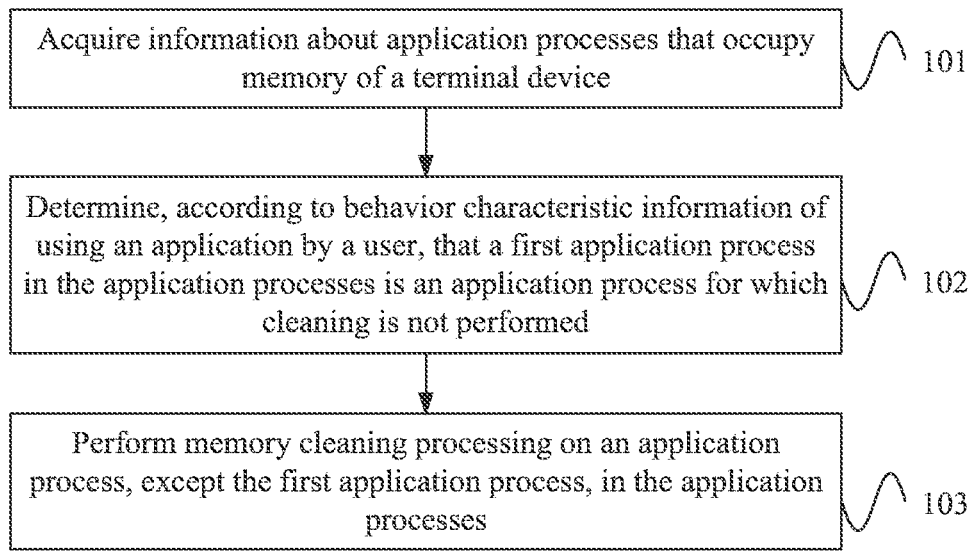
FIG. 1 is a schematic flowchart of Embodiment 1 of a memory cleaning method according to the present invention.

FIG. 1 is a schematic flowchart of Embodiment 1 of a memory cleaning method according to the present invention. As shown in FIG. 1, this embodiment can be implemented by using a memory cleaning apparatus, and this apparatus may be integrated into a terminal device to implement the method in this embodiment, where the terminal device may be a mobile phone, a tablet computer, a notebook computer, a desktop computer, or the like, and this embodiment is not limited thereto. The method in this embodiment may include the following steps:

Step 101: Acquire information about application processes that occupy memory of the terminal device.

In this embodiment, the memory cleaning apparatus may acquire the information about the application processes that occupy the memory of the terminal device, that is, the memory cleaning apparatus may learn processes, which occupy the memory of the terminal device, of applications, so that when memory cleaning is subsequently performed, some application processes are selected from all application processes that occupy the memory of the terminal device so as to release a part of the memory and increase available memory of the terminal device. It should be noted that, the application processes that occupy the memory of the terminal device include application processes that are running on a foreground, application processes that are switched to running in a background, and application processes that do not completely exit from running, and memory, except the memory occupied by the application processes, in the terminal device may be determined as available memory.

Step 102: Determine, according to behavior characteristic information of using an application by a user, that a first application process in the application processes is an application process for which cleaning is not performed.

In this embodiment, after acquiring the information about the application processes that occupy the memory of the terminal device, the memory cleaning apparatus determines, from the application processes that occupy the memory of the terminal device according to the behavior characteristic information of using an application by the user, that the first application process is the application process for which cleaning is not performed. It should be noted that, the behavior characteristic information of using an application by the user may reflect related behavior characteristic information of using an application by the user, for example, related information of an application process of an application frequently used by the user, related information of an application process of an application infrequently used by the user, and the like may be determined by using the behavior characteristic information of using an application by the user, and this embodiment imposes no limitation herein. Therefore, it may be determined, by using the behavior characteristic information of using an application by the user, that the first application process is an application process of an application being used by the user and/or an application used more frequently by the user and/or an application recently used by the user, and further, it may be determined that an application corresponding to the first application process may be probably started in a subsequent period of time; therefore, to avoid a phenomenon that a response time for starting the application again by the user is relatively long, it may be determined that the first application process is the application process for which cleaning is not performed. It should be noted that, a database is set in the terminal device, where the database may be used for storing the behavior characteristic information of using an application by the user, and the database may be set in a memory of the terminal device.

Step 103: Perform memory cleaning processing on an application process, except the first application process, in the application processes.

In this embodiment, after it is determined, from all the application processes that occupy the memory of the terminal device, that the first application process is the application process for which cleaning is not performed, it indicates that an application process, except the first application process, in all the application processes that occupy the memory of the terminal device is an application process of a second application infrequently used by the user and/or not recently used by the user; the second application process is an application process on which cleaning processing may be performed so as to release a part of memory to improve running performance of a mobile phone. It should be noted that, the first application process may represent at least one application process. Therefore, the memory cleaning apparatus performs memory cleaning processing on the application process, except the first application process, in all the application processes that occupy the memory of the terminal device, thereby reducing a response time required when the user starts again an application to which the first application process belongs. It should be noted that, a manner of performing memory cleaning processing on an application process is the same as a manner in the prior art, and this embodiment imposes no limitation herein.

In the memory cleaning method provided in Embodiment 1 of the present invention, it is determined, from application processes that occupy memory of a terminal device according to behavior characteristic information of using an application by a user, that a first application process is an application process of an application frequently used or recently used, and further, it may be determined that the first application process may be started again in a subsequent period of time; therefore, it may be determined that the first application process is an application process for which cleaning is not performed, and then memory cleaning processing is performed on an application process, except the first application process, in the application processes that occupy the memory of the terminal device, so that it may be implemented that memory cleaning is performed according to the behavior characteristic information of using an application by the user and operating performance of the terminal device is improved. Because memory cleaning is not performed on the first application process according to the behavior characteristic information of using an application by the user, a problem in the prior art is resolved, so that a response time required when the user starts the first application process again is reduced, and an experience effect of using the terminal device by the user is ensured.

Figure 2:
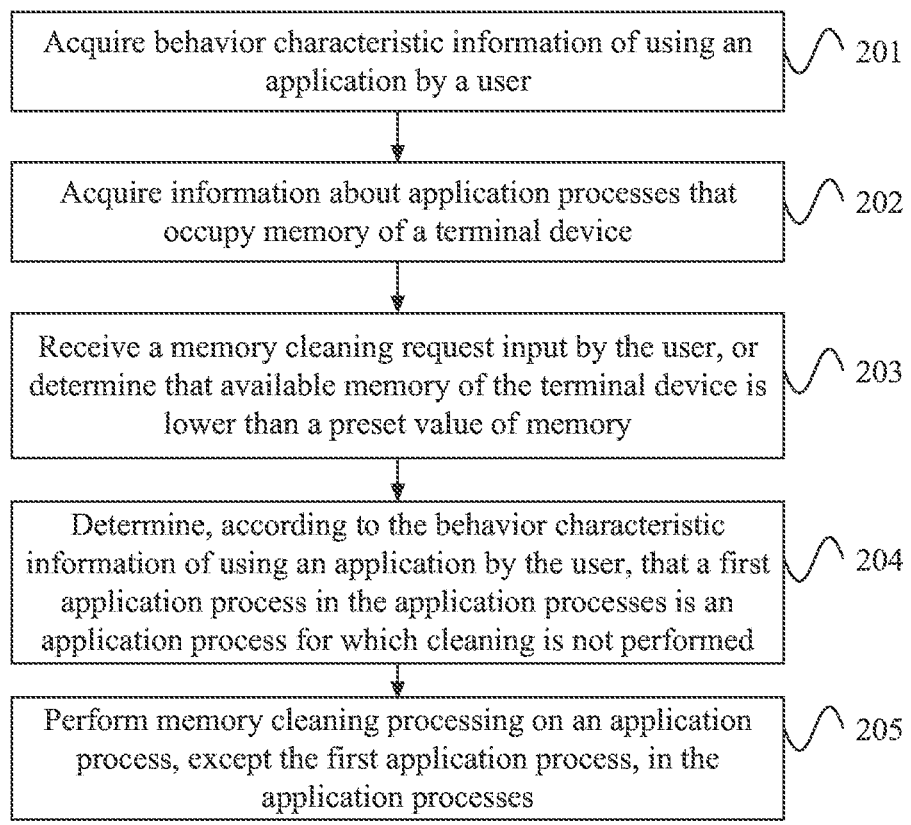
FIG. 2 is a schematic flowchart of Embodiment 2 of a memory cleaning method according to the present invention.

FIG. 2 is a schematic flowchart of Embodiment 2 of a memory cleaning method according to the present invention. As shown in FIG. 2, this embodiment can be implemented by using a memory cleaning apparatus, and this apparatus may be integrated into a terminal device to implement the method in this embodiment, where the terminal device may be a mobile phone, a tablet computer, a notebook computer, a desktop computer, or the like, and this embodiment is not limited thereto. The method in this embodiment may include the following steps:

Step 201: Acquire behavior characteristic information of using an application by a user.

In this embodiment, the memory cleaning apparatus first acquires the behavior characteristic information of using an application by the user, where the behavior characteristic information of using an application by the user includes: a usage time record of an application process and at least one of: a quantity of cumulative times of using the application process, duration in which the application process is used each time, and cumulative duration in which the application process is used. A usage time record of an application process of each used application and at least one of: a quantity of cumulative times of using each application process, duration in which each application process is used each time, and cumulative duration in which each application process is used may be determined by using the behavior characteristic information of using an application by the user. Related information of an application process such as: which application process(es) is/are an application process of applications frequently used by the user, and/or which application process(es) is/are an application process of applications used by the user for a relatively long time, and/or which application processes is/are an application process of applications recently used by the user may be determined by using the foregoing behavior characteristic information of using an application by the user.

Step 202: Acquire information about application processes that occupy memory of the terminal device.

In this embodiment, an implementation process of step 202 is similar to an implementation process of step 101. For details, reference may be made to related description in Embodiment 1, and details are not described herein again in this embodiment.

Optionally, this embodiment of the present invention may further include step 203. It should be noted that step 203 may also be performed before step 202, and this embodiment imposes no limitation herein.

Step 203: Receive a memory cleaning request input by the user, or determine that available memory of the terminal device is less than a preset value of memory.

In this embodiment, before step 204 is performed, the memory cleaning apparatus may receive the memory cleaning request input by the user, that is, the user may perform memory cleaning any time according to preferences of the user. When the user wants to perform memory cleaning, the user may input the memory cleaning request, and correspondingly, the memory cleaning apparatus may receive the memory cleaning request input by the user and perform step 204 and step 205.

Alternatively, in this embodiment, before step 204 is performed, step 204 and step 205 are performed when the memory cleaning apparatus determines that the available memory of the terminal device is in an insufficient state, that is, the memory cleaning apparatus may acquire the available memory of the terminal device, where the available memory is memory, except the memory that is occupied by the application processes, in the terminal device, and determine whether the available memory of the terminal device is less than the preset value of memory. If the available memory of the terminal device is less than the preset value of memory, it is determined that the available memory of the terminal device is in the insufficient state, and cleaning needs to be performed on memory because occupied memory is excessive, so as to release a part of memory, thereby improving running performance of the terminal device. If the available memory of the terminal device is not less than the preset value of memory, it is determined that the available memory of the terminal device is still sufficient, and temporarily, cleaning does not need to be performed on memory, that is, no operation is performed. It should be noted that, the preset value of memory may be determined according to an actual application scenario, and this embodiment imposes no limitation herein.

Step 204: Determine, according to the behavior characteristic information of using an application by the user, that a first application process in the application processes is an application process for which cleaning is not performed.

Step 205: Perform memory cleaning processing on an application process, except the first application process, in the application processes.

In this embodiment, implementation processes of step 204 and step 205 is similar to implementation processes of step 102 and step 103. For details, reference may be made to related description in Embodiment 1, and details are not described herein again in this embodiment.

In the memory cleaning method provided in Embodiment 2 of the present invention, a memory cleaning apparatus acquires behavior characteristic information of using an application by a user, then acquires information about application processes that occupy memory of a terminal device, and receives a memory cleaning request input by the user or determines that when available memory of the terminal device is less than a preset value, memory cleaning needs to be performed indeed. Then, it may be determined, according to the behavior characteristic information of using an application by the user, that a first application process is an application process for which cleaning is not performed, and then memory cleaning processing is performed on an application process, except the first application process, in the application processes that occupy the memory of the terminal device, so that it may be implemented that memory cleaning is performed according to the behavior characteristic information of using an application by the user and operating performance of the terminal device is improved. Because memory cleaning is not performed on the first application process according to the behavior characteristic information of using an application by the user, a problem in the prior art is resolved, so that a response time required when the user starts the first application process again is reduced, and an experience effect of using the terminal device by the user is ensured.

Figure 3:
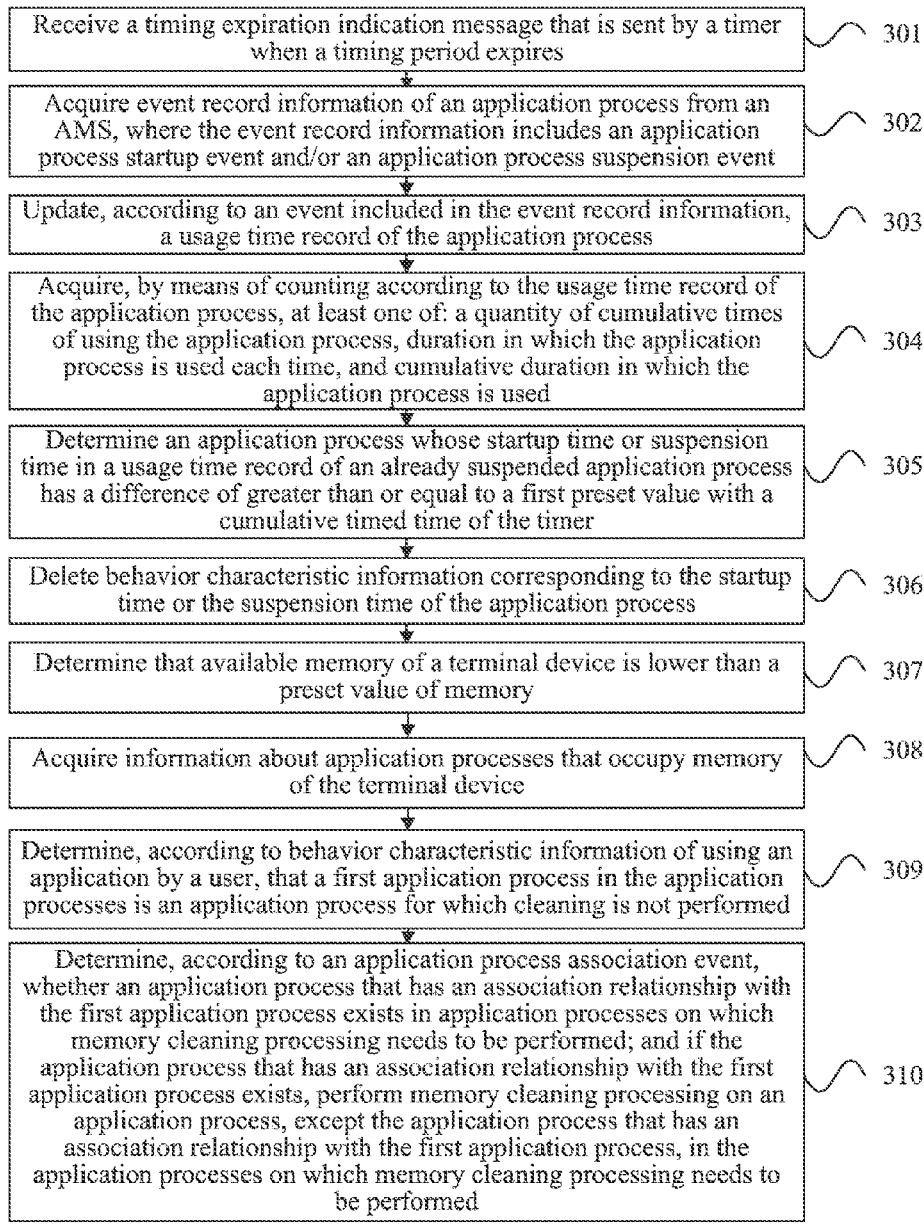
FIG. 3 is a schematic flowchart of Embodiment 3 of a memory cleaning method according to the present invention.

FIG. 3 is a schematic flowchart of Embodiment 3 of a memory cleaning method according to the present invention. As shown in FIG. 3, this embodiment can be implemented by using a memory cleaning apparatus, and this apparatus may be integrated into a terminal device to implement the method in this embodiment, where the terminal device may be a mobile phone, a tablet computer, a notebook computer, a desktop computer, or the like, and this embodiment is not limited thereto. The method in this embodiment may include the following steps:

Step 301: Receive a timing expiration indication message that is sent by a timer when a timing period expires.

In this embodiment, each time when the terminal device is powered on, the timer is started. Meanwhile, the timer may further acquire a cumulative timed time of the timer prior to a previous power-off. Then, the cumulative timed time of the timer prior to the previous power-off is used as an initial time of the timer, and then, by using the initial time of the timer as a start point, timing is performed within a range of a usage time of the terminal device. When each timing period expires, the timer sends a timing expiration indication message, and the timer adds a timing period to a previous cumulative timed time, to obtain a current cumulative timed time. It should be noted that, the timing period is determined according to an actual application scenario, and this embodiment imposes no limitation herein.

In this embodiment, after receiving the timing expiration indication message that is sent by the timer when the timing period expires, the memory cleaning apparatus needs to acquire, when the timing period expires, behavior characteristic information of using an application by a user, where an implementation process of acquiring the behavior characteristic information of using an application by the user may include steps 302 to 304, and the behavior characteristic information of using an application by the user includes: a usage time record of an application process and at least one of: a quantity of cumulative times of using the application process, duration in which the application process is used each time, and cumulative duration in which the application process is used.

Optionally, when the timer is started, the timing period of the timer may expire by default. In this case, the timer also sends the timing expiration indication message. Then, the memory cleaning apparatus may perform steps in steps 301 to 310 except step 307, which is to ensure that memory cleaning is performed once on the terminal device each time when the terminal device is powered on and the terminal device has sufficient available memory when being started, so as to ensure operating performance of the terminal device.

Step 302: Acquire event record information of an application process from an activity manager service (Activity manager service, AMS for short), where the event record information includes an application process startup event and/or an application process suspension event.

In this embodiment, the AMS may be application process management software in the prior art, and may manage an application process startup event, an application process suspension event, and an application process termination event (similar to, for example, a function of a task manager on an operating system interface of a computer). Therefore, in each timing period, the AMS records an event of an application process. Because the AMS may be responsible for managing an application process in a system, the AMS may record an application process startup event and/or an application process suspension event into an event of the application process to form event record information of the application process. The event record information of the application process may include the application process startup event and/or the application process suspension event, and further, may further include related information (for example, identifier information of the application process) of the application process. The AMS may store the event record information of the application process in a list. Therefore, when each timing period expires, the memory cleaning apparatus acquires, from the AMS, the event record information of the application process in the timing period.

Preferably, the AMS may record application process association events in a timing period, that is, association relationships between application processes for which events occur in the timing period. In this embodiment, the memory cleaning apparatus may further acquire these association relationships when each timing period expires. The application process association events (that is, the association relationships between application processes) include an association relationship between application processes that belong to a same application, and an association relationship between application processes that serve as a client process and a server process. The memory cleaning apparatus may store these association events in a database.

Step 303: Update, according to an event included in the event record information, a usage time record of the application process.

In this embodiment, the usage time record of the application process is updated according to the event included in the acquired event record information. Specifically, if the event included in the event record information is the application process startup event, a last startup time of the application process in the usage time record of the application process is updated with a cumulative time of the timer; if the event included in the event record information is the application process suspension event, a last suspension time of the application process in the usage time record of the application process is updated with a cumulative time of the timer; or if the event included in the event record information is the application process startup event and the application process suspension event, a last startup time of the application process in the usage time record of the application process is updated with a time that is obtained by subtracting one timing period from a cumulative time of the timer, and a suspension time is updated with the cumulative time of the timer.

Step 304: Acquire, by means of counting according to the usage time record of the application process, at least one of: a quantity of cumulative times of using the application process, duration in which the application process is used each time, and cumulative duration in which the application process is used.

In this embodiment, after the updated usage time record of the application process is acquired, at least one of: the quantity of cumulative times of using the application process, the duration in which the application process is used each time, and the cumulative duration in which the application process is used may be acquired, by means of counting according to the usage time record of the application process.

In a first feasible implementation manner, if the event record information is the application process startup event, the acquiring, by means of counting according to the usage time record of the application process, at least one of: a quantity of cumulative times of using the application process, duration in which the application process is used each time, and cumulative duration in which the application process is used may include: determining, according to the application process startup event, the quantity of cumulative times of using the application process.

In this embodiment, the application process startup event is used as a flag for using the application process. A quantity, previously obtained according to the application process startup event, of cumulative times of using the application process is increased by 1; therefore, a quantity, currently obtained according to the application process startup event, of cumulative times of using the application process may be determined.

In a second feasible implementation manner, if the event record information is the application process suspension event, the acquiring, by means of counting according to the usage time record of the application process, at least one of: a quantity of cumulative times of using the application process, duration in which the application process is used each time, and cumulative duration in which the application process is used includes: determining, according to the usage time record, the application process suspension event, and an application process startup event corresponding to the application process suspension event, at least one of: the duration in which the application process is used each time and the cumulative duration in which the application process is used.

In this embodiment, a last suspension time of the application process is determined from the usage time record of the application process according to the application process suspension event. Because an application process suspension event is definitely corresponding to an application process startup event, the application process startup event corresponding to the application process suspension event may be determined. A last startup time of the application process may be determined from the usage time record of the application process according to the application process startup event, and it may be determined that a difference between the last suspension time and the last startup time is duration in which the application process is currently used. Further, the duration in which the application process is currently used may also be added to cumulative duration, previously obtained according to the application process suspension event, in which the application process is used; therefore, cumulative duration, currently obtained according to the application process suspension event, in which the application process is used may be determined.

In a third feasible implementation manner, if the event record information is the application process startup event and the application process suspension event, the acquiring, by means of counting according to the usage time record of the application process, at least one of: a quantity of cumulative times of using the application process, duration in which the application process is used each time, and cumulative duration in which the application process is used includes: determining, according to the application process startup event, the quantity of cumulative times of using the application process; and determining, according to the usage time record, the application process suspension event, and an application process startup event corresponding to the application process suspension event, at least one of: the duration in which the application process is used each time and the cumulative duration in which the application process is used.

In this embodiment, the application process startup event is used as a flag for using the application process. A quantity, previously obtained according to the application process startup event, of cumulative times of using the application process is increased by 1; therefore, a quantity, currently obtained according to the application process startup event, of cumulative times of using the application process may be determined. In addition, a last startup time of the application process is determined from the usage time record of the application process according to the application process startup event, where the last startup time is a time obtained by subtracting one timing period from a cumulative timed time of the timer. A last suspension time of the application process is determined from the usage time record of the application process according to the application process suspension event, where the last suspension time is the cumulative timed time of the timer. Therefore, it may be determined that a difference between the last suspension time and the last startup time of the application process is duration in which the application process is currently used, where the duration in which the application process is currently used is used as one timing period. Further, the duration in which the application process is currently used is added to cumulative duration, previously obtained according to the application process suspension event, in which the application process is used; therefore, cumulative duration, currently obtained according to the application process suspension event, in which the application process is used may be determined.

The behavior characteristic information, obtained in step 303 and step 304, of using an application by the user may be stored in a database.

After step 304 is performed, preferably, because the behavior characteristic information of using an application by the user is stored in a database in a memory of the terminal device, and memory space of the terminal device is limited, the behavior characteristic information of the user cannot be stored without limitations. Meanwhile, in order to store only behavior characteristic information, in a recent period of time, of using an application by the user, this embodiment may further include step 305 and step 306.

Step 305: Determine an application process whose startup time or suspension time in a usage time record of an already suspended application process has a difference of greater than or equal to a first preset value with a cumulative timed time of the timer.

Step 306: Delete behavior characteristic information corresponding to the startup time or the suspension time of the application process.

In this embodiment, in a first feasible implementation manner, if it is determined that the difference between the startup time in the usage time record of an already suspended application process and the cumulative timed time of the timer is greater than or equal to the first preset value, step 306 may be performed. Specifically, according to a startup time in the usage time record of the application process, a suspension time corresponding to the suspension time is determined; duration at one time, corresponding to the startup time, in which the application process is used may further be determined; and cumulative duration in which the application process is used and a quantity of cumulative times of using the application process may further be determined. Then, the foregoing determined duration, at one time, in which the application process is used is subtracted from the cumulative duration in which the application process is used, 1 is subtracted from the quantity of cumulative times of using the application process, the foregoing determined duration, at one time, in which the application process is used is deleted, and the startup time and the foregoing determined suspension time are deleted from the usage time record of the application process. If it is determined that the difference between the startup time in the usage time record of an already suspended application process and the cumulative timed time of the timer is less than the first preset value, step 306 may not be performed.

In a second feasible implementation manner, if it is determined that the difference between the suspension time in the usage time record of an already suspended application process and the cumulative timed time of the timer is greater than or equal to the first preset value, step 306 may be performed. Specifically, according to a suspension time in the usage time record of the application process, a startup time corresponding to the startup time is determined; duration at one time, corresponding to the suspension time, in which the application process is used may further be determined; and cumulative duration in which the application process is used and a quantity of cumulative times of using the application process may further be determined. Then, the foregoing determined duration, at one time, in which the application process is used is subtracted from cumulative duration in which the application process is used, 1 is subtracted from the quantity of cumulative times of using the application process, the foregoing determined duration, at one time, in which the application process is used is deleted, and the suspension time and the foregoing determined startup time are deleted from the usage time record of the application process. If it is determined that the difference between the suspension time in the usage time record of an already suspended application process and the cumulative timed time of the timer is less than an application process of the first preset value, step 306 may not be performed.

It should be noted that, the first preset value is determined according to an actual application scenario, and this embodiment imposes no limitation herein.

Step 307: Determine that available memory of the terminal device is less than a preset value of memory.

In this embodiment, for an implementation process of determining that the available memory of the terminal device is less than the preset value of memory in this embodiment, reference may be made to related description in step 203 in Embodiment 2 of the memory cleaning method in the present invention, and details are not described herein again in this embodiment. It should be noted that, the memory cleaning apparatus may automatically perform detection on the available memory of the terminal device when a timing period expires, and may automatically perform steps 308 to 310 when it is determined that the available memory of the terminal device is less than the preset value of memory.

Step 308: Acquire information about application processes that occupy memory of the terminal device.

In this embodiment, after it is determined that the available memory of the terminal device is less than the preset value of memory, the information about the application processes that occupy the memory of the terminal device is acquired. In this embodiment, for an implementation process of acquiring the information about the application processes that occupy the memory of the terminal device, reference may be made to related description in step 101 of Embodiment 1 of the memory cleaning method in the present invention, and details are not described herein again in this embodiment. In this embodiment, the AMS may record information about application processes that currently occupy memory of the terminal device. Therefore, the memory cleaning apparatus may acquire, from the AMS, the information about the application processes (including an application process that is running and an application that exits but still occupies memory of the terminal device) that currently occupy the memory of the terminal device.

Step 309: Determine, according to behavior characteristic information of using an application by a user, that a first application process in the application processes is an application process for which cleaning is not performed.

In this embodiment, the determining, according to behavior characteristic information of using an application by a user, that a first application process in the application processes is an application process for which cleaning is not performed includes the following:

If it is determined, according to a usage time record of the first application process, that a difference between a last suspension time of the first application process and the cumulative timed time of the timer is less than or equal to a second preset value, it is determined that the first application process is the application process for which cleaning is not performed. In other words, if the last suspension time of the first application process is acquired from the usage time record of the first application process, and it is determined that the difference between the last suspension time of the first application process and the cumulative timed time of the timer is less than or equal to the second preset value, that is, if the last suspension time is within a period of time between a time obtained by subtracting the second preset value from the cumulative timed time of the timer, and the cumulative timed time of the timer, it may indicate that the first application process has been used in a previous period of time, and it may be considered that a probability of using the first application process in a subsequent period of time is relatively large. Then, it may be determined that the first application process is the application process for which cleaning is not performed, so as to avoid a relatively long response time required when the first application process is started. It should be noted that, the second preset value may be determined according to an actual application scenario, and this embodiment imposes no limitation herein.

If it is determined, according to a usage time record of the first application process, that a difference between a last suspension time of the first application process and the cumulative timed time of the timer is greater than a second preset value and less than or equal to a third preset value, it is determined whether a quantity of cumulative times of using the first application process and/or cumulative duration in which the first application process is used exceed or exceeds a preset threshold; if the quantity of cumulative times of using the first application process and/or cumulative duration in which the first application process is used exceed or exceeds the preset threshold, it is determined that the first application process is the application process for which cleaning is not performed. In other words, if the last suspension time of the first application process is acquired from the usage time record of the first application process, and it is determined that the difference between the last suspension time of the first application process and the cumulative timed time of the timer is greater than the second preset value and less than or equal to the third preset value, that is, if it is determined that the last suspension time is within a period of time between a time that is obtained by subtracting the third preset value from the cumulative timed time of the timer, and a time that is obtained by subtracting the second preset value from the cumulative timed time of the timer, it is required to determine whether a quantity of cumulative times of using the first application process and/or cumulative duration in which the first application process is used exceed or exceeds a preset threshold so as to indicate that the quantity of cumulative times of using the first application process is relatively large and/or a time of using the first application process is relatively long. It may be considered that a probability of using the first application process in a subsequent period of time is relatively large. Then, it may be determined that the first application process is the application process for which cleaning is not performed, so as to avoid a relatively long response time required when the first application process is started. It should be noted that, the third preset value may be determined according to an actual application scenario, and this embodiment imposes no limitation herein; and the second preset value is less than the third preset value.

It should be noted that, in this embodiment, it is further determined that an application process of an application that is running in a foreground is an application process for which cleaning is not performed so as to ensure normal use of a user.

In this embodiment, after it is determined, according to the behavior characteristic information of using an application by the user, that the first application process in the application processes is the application process for which cleaning is not performed, memory cleaning processing is performed on an application process, except the first application process, in the application processes, where in this embodiment, an implementation process of performing memory cleaning processing on the application process, except the first application process, in the application processes may include step 310.

Step 310: Determine, according to an application process association event, whether an application process that has an association relationship with the first application process exists in application processes on which memory cleaning processing needs to be performed; if the application process that has an association relationship with the first application process exists, perform memory cleaning processing on an application process, except the application process that has an association relationship with the first application process, in the application processes on which memory cleaning processing needs to be performed.

In this embodiment, an application process for which cleaning is not performed may be determined by using the foregoing steps, and it may be determined, from all application processes that occupy memory of the terminal device, that application processes except the application process for which cleaning is not performed is application processes on which memory cleaning processing needs to be performed. Then, it may be determined, according to the application process association event, whether an application process that has an association relationship with the first application process exists in the application processes on which memory cleaning processing needs to be performed. Which application process(es) has/have an association relationship with the first application process may be determined by acquiring an application process startup event and/or an application process suspension event from the AMS as well as acquiring the application process association event (that is, an association relationship between application processes) from the AMS. Therefore, in this embodiment, the event record information, acquired from the AMS, of the application process further includes the application process association event.

If an application process in the application processes on which memory cleaning processing needs to be performed, and the first application process belong to a same application, it indicates that the application process has an association relationship with the first application process. In a case in which the first application process is an application process for which cleaning is not performed, memory cleaning processing is not performed on the application process that has an association relationship with the first application process, that is, if it is determined that the application process that has an association relationship with the first application process exists in the application processes on which memory cleaning processing needs to be performed, memory cleaning processing is performed on an application process, except the application process that has an association relationship with the first application process, in the application processes on which memory cleaning processing needs to be performed.

If an application process in the application processes on which memory cleaning processing needs to be performed, and the first application process serve as a client process and a server process, that is, if the first application process is a client process, and the application process in the application processes on which memory cleaning processing needs to be performed is a server process of the first application process, it indicates that the application process has an association relationship with the first application process. To ensure that the first application process runs normally, in a case in which the first application process is an application process for which cleaning is not performed, memory cleaning processing is not performed on the application process that has an association relationship with the first application process, that is, if it is determined that the application process that has an association relationship with the first application process exists in the application processes on which memory cleaning processing needs to be performed, memory cleaning processing is performed on an application process, except the application process that has an association relationship with the first application process, in the application processes on which memory cleaning processing needs to be performed. If the first application process is a server process, and an application process in the application processes on which memory cleaning processing needs to be performed is a client process of the first application process, in this case, deletion of the client process does not affect normal running of the server process. Therefore, memory cleaning processing may be performed on the client process of the first application process.

In this embodiment, the memory cleaning apparatus may further send, to the AMS, information about the application process, except the application process that has an association relationship with the first application process, in the determined application processes on which memory cleaning processing needs to be performed, and the AMS performs memory cleaning processing on the application process(es).

In the memory cleaning method provided in Embodiment 3 of the present invention, when a timing period expires, event record information of an application process is acquired from an AMS, a usage time record of the application process is updated according to an event included in the event record information, and then at least one of: a quantity of cumulative times of using the application process, duration in which the application process is used each time, and cumulative duration in which the application process is used is acquired by means of counting according to the usage time record of the application process, so as to acquire behavior characteristic information of using an application by a user. When a difference between a startup time or a suspension time in a usage time record of an already suspended application process and a cumulative timed time of a timer is greater than or equal to a first preset value, behavior characteristic information corresponding to the startup time or the suspension time of the application process is deleted, so as to ensure that the behavior characteristic information of using an application by the user reflects a behavior of the user in a recent period of time. After it is determined that available memory of a terminal device is less than a preset value of memory, information about application processes that occupy memory of the terminal device is acquired. It is determined, according to the behavior characteristic information of using an application by the user, that a first application process in the application processes is an application process for which cleaning is not performed, and then memory cleaning processing is performed on an application process, except an application process that has an association relationship with the first application process, in application processes on which memory cleaning processing needs to be performed, so as to ensure that the first application process runs normally. It is implemented that cleaning is automatically performed on memory according to the behavior characteristic information of using an application by the user, and operating performance of the terminal device is improved. Meanwhile, a problem in the prior art is resolved, so that a response time required when the user starts the first application process again is reduced, and an experience effect of using the terminal device by the user is ensured.

Figure 4:
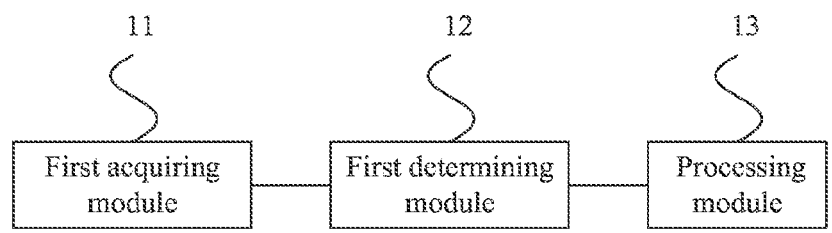
FIG. 4 is a schematic structural diagram of Embodiment 1 of a memory cleaning apparatus according to the present invention.

FIG. 4 is a schematic structural diagram of Embodiment of a memory cleaning apparatus according to the present invention. As shown in FIG. 4, the apparatus in this embodiment may include: a first acquiring module 11, a first determining module 12, and a processing module 13, where the first acquiring module 11 is configured to acquire information about application processes that occupy memory of a terminal device; the first determining module 12 is configured to determine, according to behavior characteristic information of using an application by a user, that a first application process in the application processes is an application process for which cleaning is not performed; and the processing module 13 is configured to perform memory cleaning processing on an application process, except the first application process, in the application processes.

The apparatus in this embodiment may be configured to execute the technical solution of the method embodiment shown in FIG. 1, and implementation principles and technical effects thereof are similar. For details, reference may be made to related description of the foregoing embodiment, and details are not described herein again.

Figure 5:
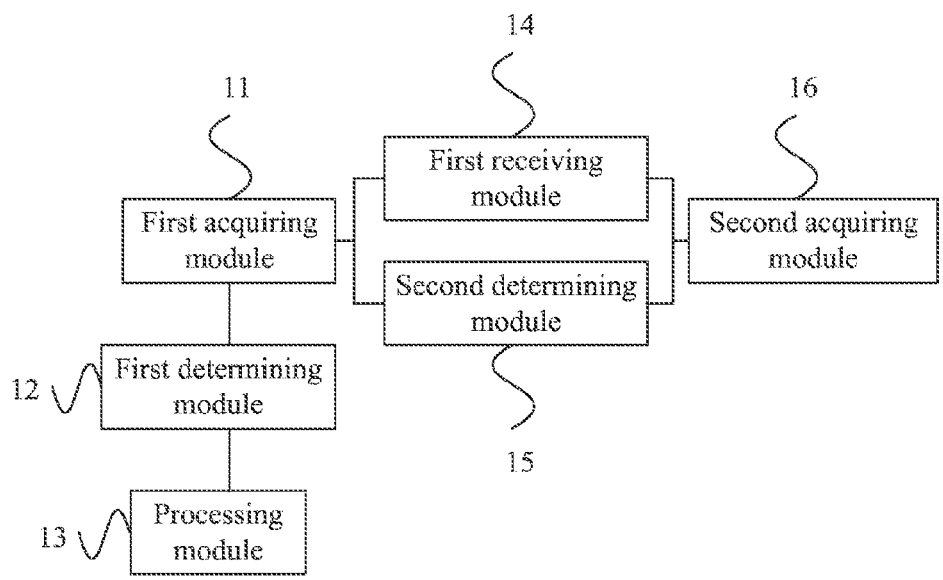
FIG. 5 is a schematic structural diagram of Embodiment 2 of a memory cleaning apparatus according to the present invention.

FIG. 5 is a schematic structural diagram of Embodiment 2 of a memory cleaning apparatus according to the present invention. As shown in FIG. 5, based on a structure of the apparatus shown in FIG. 4, further, the apparatus in this embodiment may further include: a first receiving module 14 or a second determining module 15, where the first receiving module 14 is configured to: before the first determining module 12 determines, according to the behavior characteristic information of using an application by the user, that the first application process in the application processes is the application process for which cleaning is not performed, receive a memory cleaning request input by the user; and the second determining module 15 is configured to: before the first determining module 12 determines, according to the behavior characteristic information of using an application by the user, that the first application process in the application processes is the application process for which cleaning is not performed, determine that available memory of the terminal device is less than a preset value of memory.

Further, the apparatus in this embodiment may further include a second acquiring module 16, where the second acquiring module 16 is configured to: before the first acquiring module 11 acquires the information about the application processes that occupy the memory of the terminal device, acquire the behavior characteristic information of using an application by the user.

The behavior characteristic information includes: a usage time record of an application process and at least one of: a quantity of cumulative times of using the application process, duration in which the application process is used each time, and cumulative duration in which the application process is used.

The apparatus in this embodiment may be configured to execute the technical solution of the method embodiment shown in FIG. 2, and implementation principles and technical effects thereof are similar. For details, reference may be made to related description of the foregoing embodiment, and details are not described herein again.

Figure 6:
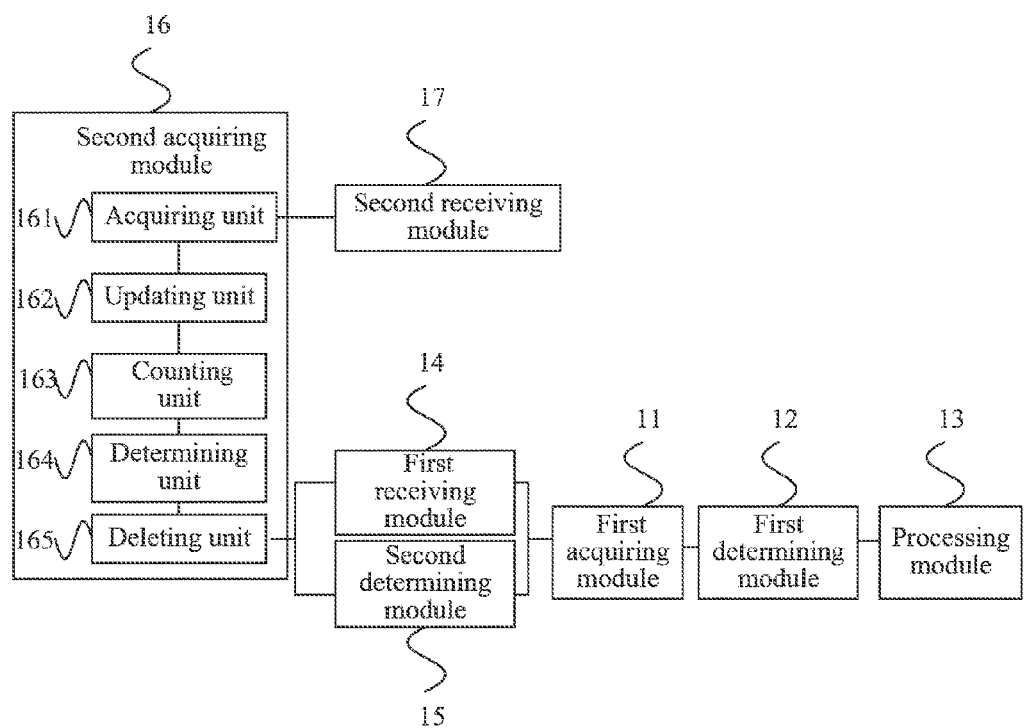
FIG. 6 is a schematic structural diagram of Embodiment 3 of a memory cleaning apparatus according to the present invention.

FIG. 6 is a schematic structural diagram of Embodiment 3 of a memory cleaning apparatus according to the present invention. As shown in FIG. 6, based on a structure of the apparatus shown in FIG. 5, further, the apparatus in this embodiment may further include: a second receiving module 17, where the second receiving module 17 is configured to: before the second acquiring module 16 acquires the behavior characteristic information of using an application by the user, receive a timing expiration indication message that is sent by a timer when a timing period expires. The second acquiring module 16 may include: an acquiring unit 161, an updating unit 162, and a counting unit 163, where the acquiring unit 161 is configured to acquire event record information of the application process from an activity manager service AMS, where the event record information includes an application process startup event and/or an application process suspension event; the updating unit 162 is configured to update, according to an event included in the event record information, the usage time record of the application process; and the counting unit 163 is configured to acquire, by means of counting according to the usage time record of the application process, at least one of: the quantity of cumulative times of using the application process, the duration in which the application process is used each time, and the cumulative duration in which the application process is used.

Further, the counting unit 163 is specifically configured to:

if the event record information is the application process startup event, determine, according to the application process startup event, the quantity of cumulative times of using the application process;

if the event record information is the application process suspension event, determine, according to the usage time record, the application process suspension event, and an application process startup event corresponding to the application process suspension event, at least one of: the duration in which the application process is used each time and the cumulative duration in which the application process is used; or if the event record information is the application process startup event and the application process suspension event, determine, according to the application process startup event, the quantity of cumulative times of using the application process; and determine, according to the usage time record, the application process suspension event, and an application process startup event corresponding to the application process suspension event, at least one of: the duration in which the application process is used each time and the cumulative duration in which the application process is used.

Preferably, the second acquiring module 16 in this embodiment further includes: a determining unit 164 and a deleting unit 165, where the determining unit 164 is configured to determine an application process whose startup time or suspension time in a usage time record of an already suspended application process has a difference of greater than or equal to a first preset value with a cumulative timed time of the timer; and the deleting unit 165 is configured to delete behavior characteristic information corresponding to the startup time or the suspension time of the application process.

Further, the first determining module 12 in this embodiment is specifically configured to:

if it is determined, according to a usage time record of the first application process, that a difference between a last suspension time of the first application process and the cumulative timed time of the timer is less than or equal to a second preset value, determine that the first application process is the application process for which cleaning is not performed; or if it is determined, according to a usage time record of the first application process, that a difference between a last suspension time of the first application process and the cumulative timed time of the timer is greater than a second preset value and less than or equal to a third preset value, determine whether a quantity of cumulative times of using the first application process and/or cumulative duration in which the first application process is used exceed or exceeds a preset threshold; and if the quantity of cumulative times of using the first application process and/or cumulative duration in which the first application process is used exceed or exceeds the preset threshold, determine that the first application process is the application process for which cleaning is not performed.

Further, the event record information acquired from the AMS further includes an application process association event. The processing module 13 is specifically configured to determine, according to the application process association event, whether an application process that has an association relationship with the first application process exists in application processes on which memory cleaning processing needs to be performed; and if the application process that has an association relationship with the first application process exists, perform memory cleaning processing on an application process, except the application process that has an association relationship with the first application process, in the application processes on which memory cleaning processing needs to be performed.

The apparatus in this embodiment may be configured to execute the technical solution of the method embodiment shown in FIG. 3, and implementation principles and technical effects thereof are similar. For details, reference may be made to related description of the foregoing embodiment, and details are not described herein again.

Figure 7:
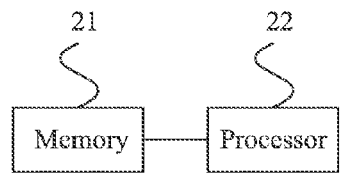
FIG. 7 is a schematic structural diagram of Embodiment 4 of a memory cleaning apparatus according to the present invention.

FIG. 7 is a schematic structural diagram of Embodiment 4 of a memory cleaning apparatus according to the present invention. As shown in FIG. 7, the apparatus in this embodiment includes: a memory 21 and a processor 22 connected to the memory 21, where the memory 21 stores a set of program code, and the memory 21 may include a non-volatile memory (Non-volatile Memory). The processor 22 may be a central processing unit (Central Processing Unit, CPU for short), or an application-specific integrated circuit (Application Specific Integrated Circuit, ASIC for short), or may be configured as one or more integrated circuits for implementing this embodiment of the present invention. The processor 22 is configured to invoke the program code stored in the memory 21 to perform the following operations:

acquiring information about application processes that occupy memory of a terminal device;

determining, according to behavior characteristic information of using an application by a user, that a first application process in the application processes is an application process for which cleaning is not performed; and performing memory cleaning processing on an application process, except the first application process, in the application processes.

Optionally, before the determining, according to behavior characteristic information of using an application by a user, that a first application process in the application processes is an application process for which cleaning is not performed, the operations further include:

receiving a memory cleaning request input by the user; or determining that available memory of the terminal device is less than a preset value of memory.

Further, before the acquiring information about application processes that occupy memory of a terminal device, the operations further include:

acquiring the behavior characteristic information of using an application by the user.

The behavior characteristic information includes: a usage time record of an application process and at least one of: a quantity of cumulative times of using the application process, duration in which the application process is used each time, and cumulative duration in which the application process is used.

Further, before the acquiring the behavior characteristic information of using an application by the user, the operations further include:

receiving a timing expiration indication message that is sent by a timer when a timing period expires.

The acquiring the behavior characteristic information of using an application by the user includes:

acquiring event record information of the application process from an activity manager service AMS, where the event record information includes an application process startup event and/or an application process suspension event;

updating, according to an event included in the event record information, the usage time record of the application process; and acquiring, by means of counting according to the usage time record of the application process, at least one of: the quantity of cumulative times of using the application process, the duration in which the application process is used each time, and the cumulative duration in which the application process is used.

Further, if the event record information is the application process startup event, the acquiring, by means of counting according to the usage time record of the application process, at least one of: the quantity of cumulative times of using the application process, the duration in which the application process is used each time, and the cumulative duration in which the application process is used includes:

determining, according to the application process startup event, the quantity of cumulative times of using the application process;

if the event record information is the application process suspension event, the acquiring, by means of counting according to the usage time record of the application process, at least one of: the quantity of cumulative times of using the application process, the duration in which the application process is used each time, and the cumulative duration in which the application process is used includes:

determining, according to the usage time record, the application process suspension event, and an application process startup event corresponding to the application process suspension event, at least one of: the duration in which the application process is used each time and the cumulative duration in which the application process is used; or if the event record information is the application process startup event and the application process suspension event, the acquiring, by means of counting according to the usage time record of the application process, at least one of: the quantity of cumulative times of using the application process, the duration in which the application process is used each time, and the cumulative duration in which the application process is used includes:

determining, according to the application process startup event, the quantity of cumulative times of using the application process; and determining, according to the usage time record, the application process suspension event, and an application process startup event corresponding to the application process suspension event, at least one of: the duration in which the application process is used each time and the cumulative duration in which the application process is used.

Preferably, the operations further include:

determining an application process whose startup time or suspension time in a usage time record of an already suspended application process has a difference of greater than or equal to a first preset value with a cumulative timed time of the timer; and deleting behavior characteristic information corresponding to the startup time or the suspension time of the application process.

Preferably, the determining, according to behavior characteristic information of using an application by a user, that a first application process in the application processes is an application process for which cleaning is not performed includes:

if it is determined, according to a usage time record of the first application process, that a difference between a last suspension time of the first application process and the cumulative timed time of the timer is less than or equal to a second preset value, determining that the first application process is the application process for which cleaning is not performed; or if it is determined, according to a usage time record of the first application process, that a difference between a last suspension time of the first application process and the cumulative timed time of the timer is greater than a second preset value and less than or equal to a third preset value, determining whether a quantity of cumulative times of using the first application process and/or cumulative duration in which the first application process is used exceed or exceeds a preset threshold; and if the quantity of cumulative times of using the first application process and/or cumulative duration in which the first application process is used exceed or exceeds the preset threshold, determining that the first application process is the application process for which cleaning is not performed.

Further, the event record information acquired from the AMS further includes an application process association event.

The performing memory cleaning processing on an application process, except the first application process, in the application processes includes:

determining, according to the application process association event, whether an application process that has an association relationship with the first application process exists in application processes on which memory cleaning processing needs to be performed; and if the application process that has an association relationship with the first application process exists, performing memory cleaning processing on an application process, except the application process that has an association relationship with the first application process, in the application processes on which memory cleaning processing needs to be performed.

It should be noted that, for a technical solution specifically implemented by the processor 22 by invoking the program code stored in the memory 21, reference may be made to any one of the memory cleaning method embodiments shown in FIG. 1 to FIG. 3 in the present invention, and implementation principles and technical effects thereof are similar. For details, reference may be made to related description of the foregoing embodiments, and details are not described herein again.

Figure 8:
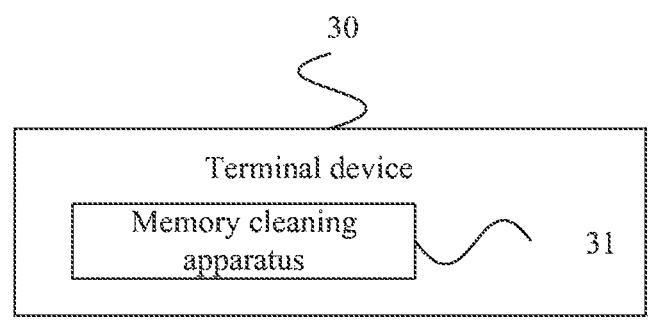
FIG. 8 is a schematic structural diagram of an embodiment of a terminal device according to the present invention.

FIG. 8 is a schematic structural diagram of Embodiment 1 of a terminal device according to the present invention. As shown in FIG. 8, a terminal device 30 in this embodiment may include a memory cleaning apparatus 31, that is, on a basis of having related functions in the prior art, the terminal device 30 further includes the memory cleaning apparatus 31, where the memory cleaning apparatus 31 may use a structure of any one of the memory cleaning apparatus embodiments shown in FIG. 4 to FIG. 7, and correspondingly, may implement the technical solution of any one of the method embodiments shown in FIG. 1 to FIG. 3. Implementation principles and technical effects thereof are similar. For details, reference may be made to related description of the foregoing embodiments, and details are not described herein again. The terminal device 30 may be a device on which an application program is installed, for example, a mobile phone, a tablet computer, a notebook computer, or a desktop computer.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A terminal device, comprising:
    a transmitter;
    a processor connected to the transmitter; and
    a non-transitory computer readable medium connected to the processor and having stored thereon instructions that, when executed, cause the processor to:
        acquire information about application processes that occupy memory of the terminal device;
        determine, according to at least one of a frequency of use of an application or a recency of use of the application, which is determined according to behavior characteristic information of using the application by a user, that a first application process in the application processes is an application process for which cleaning is not performed, wherein the behavior characteristic information comprises a usage time record of an application process and at least one of a quantity of cumulative times of using the application process, duration in which the application process is used each time, or cumulative duration in which the application process is used; and
        perform memory cleaning processing on an application process, except the first application process, in the application processes.

2. The device of claim 1, wherein the non-transitory computer readable medium further has stored thereon instructions that, when executed, cause the processor to receive a memory cleaning request input by the user before the determination of the first application process.

3. The device of claim 1, wherein the non-transitory computer readable medium further has stored thereon instructions that, when executed, cause the processor to determine that available memory of the terminal device is less than a preset value of memory before the determination of the first application process.

4. The device of claim 1, wherein the non-transitory computer readable medium further has stored thereon instructions that, when executed, cause the processor to acquire the behavior characteristic information of using an application by the user before the acquiring information about application processes that occupy memory of the terminal device.

5. The device of claim 4, wherein the instructions that, when executed, cause the processor to determine the first application process in the application processes comprise instructions that, when executed, cause the processor to:
    determine that the first application process is the application process for which cleaning is not performed in response to determining, according to a usage time record of the first application process, that a difference between a last suspension time of the first application process and the cumulative timed time of a timer is less than or equal to a second preset value.

6. The device of claim 4, wherein the instructions that, when executed, cause the processor to determine the first application process in the application processes comprise instructions that, when executed, cause the processor to:
    determine whether at least one of a quantity of cumulative times of using the first application process or cumulative duration in which the first application process is used exceeds a preset threshold in response to determining, according to a usage time record of the first application process, that a difference between a last suspension time of the first application process and the cumulative timed time of a timer is greater than a second preset value and less than or equal to a third preset value; and
    determine that the first application process is the application process for which cleaning is not performed in response to the at least one of the quantity of cumulative times of using the first application process or cumulative duration in which the first application process is used exceeding the preset threshold.

7. The device of claim 4, wherein the non-transitory computer readable medium further has stored thereon instructions that, when executed, cause the processor to receive a timing expiration indication message when a timing period expires before the acquiring the behavior characteristic information of using an application by the user.

8. The device of claim 7, wherein the instructions that, when executed, cause the processor to acquire the behavior characteristic information of using an application by the user comprise instructions that, when executed, cause the processor to:
    acquire event record information of the application process from an activity manager service AMS, wherein the event record information comprises at least one of an application process startup event or an application process suspension event;
    update, according to an event comprised in the event record information, the usage time record of the application process; and
    acquire, by means of counting according to the usage time record of the application process, at least one of the quantity of cumulative times of using the application process, the duration in which the application process is used each time, or the cumulative duration in which the application process is used.

9. The device of claim 8, wherein the non-transitory computer readable medium further has stored thereon instructions that, when executed, cause the processor to:
    determine, according to the application process startup event and in response to the event record information being the application process startup event, the quantity of cumulative times of using the application process.

10. The device of claim 8, wherein the non-transitory computer readable medium further has stored thereon instructions that, when executed, cause the processor to:
    determine, in response to the event record information being the application process suspension event, at least one of the duration in which the application process is used each time or the cumulative duration in which the application process is used according to the usage time record, the application process suspension event, and an application process startup event corresponding to the application process suspension event.

11. The device of claim 8, wherein the non-transitory computer readable medium further has stored thereon instructions that, when executed, cause the processor to:
   determine, according to the application process startup event and in response to the event record information being one of the application process startup event and the application process suspension event, the quantity of cumulative times of using the application process; and
   determine, in response to the event record information being one of the application process startup event and the application process suspension event, at least one of the duration in which the application process is used each time or the cumulative duration in which the application process is used according to the usage time record, the application process suspension event, and an application process startup event corresponding to the application process suspension event.

12. The device of claim 8, wherein the non-transitory computer readable medium further has stored thereon instructions that, when executed, cause the processor to:
   determine an application process whose startup time or suspension time in a usage time record of an already suspended application process has a difference of greater than or equal to a first preset value with a cumulative time of a timer; and
   delete behavior characteristic information corresponding to the startup time or the suspension time of the application process.

13. The device of claim 8, wherein the event record information acquired from the AMS further comprises an application process association event.

14. The device of claim 13, wherein the instructions that, when executed, cause the processor to perform memory cleaning processing on an application process, except the first application process, in the application processes, comprise instructions that, when executed, cause the processor to:
   determine, according to the application process association event, whether an application process that has an association relationship with the first application process exists in application processes on which memory cleaning processing needs to be performed; and
   perform memory cleaning processing on an application process, except the application process that has an association relationship with the first application process, in the application processes on which memory cleaning processing needs to be performed in response to the application process that has an association with the first application process existing.

15. A method, comprising:
acquiring, by a terminal device, information about application processes being executed by a processor of the terminal device and that occupy memory of the terminal device;
determining, according to at least one of a frequency of use of an application or a recency of use of the application, which is determined according to behavior characteristic information of using the application by a user, that a first application process in the application processes is an application process for which cleaning is not performed, wherein the behavior characteristic information comprises a usage time record of an application process and at least one of a quantity of cumulative times of using the application process, duration in which the application process is used each time, or cumulative duration in which the application process is used; and
performing memory cleaning processing on an application process, except the first application process, in the application processes.

16. A terminal device, comprising:
a transmitter;
a processor connected to the transmitter; and
a non-transitory computer readable medium connected to the processor and having stored thereon instructions that, when executed, cause the processor to:
   determine a use parameter of each application of a set of applications in memory of a terminal device according to behavior characteristic information indicating usage by a user of the respective application, wherein the use parameter includes at least one of a frequency of use of an application or a recency of use of the application, wherein the behavior characteristic information comprises a usage time record of an application process and at least one of a quantity of cumulative times of using the application process, duration in which the application process is used each time, or cumulative duration in which the application process is used; and
   perform memory cleaning processing one or more application in the set of applications according to the use parameter of the respective application.

* * * * *